United States Patent
Patel et al.

(10) Patent No.: US 11,907,952 B2
(45) Date of Patent: Feb. 20, 2024

(54) SECURED ANALYTICS USING ENCRYPTED DATA

(71) Applicant: Cox Communications, Inc., Atlanta, GA (US)

(72) Inventors: Jignesh Patel, Lilburn, GA (US); Harry Tang, Johns Creek, GA (US); Matthew Edwin Carothers, Dunwoody, GA (US)

(73) Assignee: Cox Communications, Inc., Atlanta, GA (US)

( * ) Notice: Subject to any disclaimer, the term of this patent is extended or adjusted under 35 U.S.C. 154(b) by 274 days.

(21) Appl. No.: 16/815,972

(22) Filed: Mar. 11, 2020

(65) Prior Publication Data

US 2020/0294056 A1 Sep. 17, 2020

Related U.S. Application Data

(60) Provisional application No. 62/817,444, filed on Mar. 12, 2019.

(51) Int. Cl.
*G06Q 20/40* (2012.01)
*H04L 9/00* (2022.01)
(Continued)

(52) U.S. Cl.
CPC ....... *G06Q 20/4016* (2013.01); *G06F 21/602* (2013.01); *G06Q 20/382* (2013.01);
(Continued)

(58) Field of Classification Search
CPC ............ G06Q 20/4016; G06Q 20/382; G06Q 2220/00; G06Q 20/3821; G06Q 20/3823;
(Continued)

(56) References Cited

U.S. PATENT DOCUMENTS

2014/0051417 A1\* 2/2014 Wuerch .................. H04W 8/28
455/418
2014/0281567 A1\* 9/2014 Rane ..................... H04L 9/3231
713/186

(Continued)

FOREIGN PATENT DOCUMENTS

JP 2011211593 A \* 10/2011
JP 5985123 B1 \* 9/2016 .......... G06F 16/334

*Primary Examiner* — Neha Patel
*Assistant Examiner* — Chunling Ding
(74) *Attorney, Agent, or Firm* — Eversheds Sutherland (US) LLP

(57) ABSTRACT

Devices, systems, and methods are provided for performing secured analytics using encrypted data. The method may include receiving first data and second data, the first data and the second data being homomorphically encrypted, the first data associated with a first type of data, and the second data associated with a second type of data. The method may include retrieving third data associated with the first type of data, and retrieving fourth data associated with the second type of data. The method may include determining a first proximity between the first data and the third data, and determining a second proximity between the second data and the fourth data. The method may include determining, based on the first proximity and the second proximity, a risk score, and determining, based on the risk score, a fraudulent action associated with the first data and the second data.

20 Claims, 6 Drawing Sheets

(51) Int. Cl.
   *G06Q 20/38*     (2012.01)
   *H04L 9/06*      (2006.01)
   *G06F 21/60*     (2013.01)

(52) U.S. Cl.
   CPC ............ *H04L 9/008* (2013.01); *H04L 9/0618* (2013.01); *G06Q 2220/00* (2013.01)

(58) Field of Classification Search
   CPC ... G06Q 20/34; G06F 21/602; G06F 21/6227; H04L 9/008; H04L 9/0618; H04L 9/0894; H04L 2209/56; H04L 2209/80
   See application file for complete search history.

(56) References Cited

U.S. PATENT DOCUMENTS

| | | | |
|---|---|---|---|
| 2016/0204936 A1* | 7/2016 | Sakemi | G06F 21/6227 380/28 |
| 2017/0005787 A1* | 1/2017 | Weaver | G16B 50/40 |
| 2017/0104752 A1* | 4/2017 | Morikawa | H04L 9/0618 |
| 2017/0124535 A1* | 5/2017 | Juels | G06Q 20/065 |
| 2017/0142109 A1* | 5/2017 | Mandal | H04L 9/3073 |
| 2017/0293913 A1* | 10/2017 | Gulak | G06Q 20/3829 |
| 2019/0140818 A1* | 5/2019 | Bent | H04L 9/3093 |
| 2019/0342270 A1* | 11/2019 | Laine | G06F 21/602 |
| 2020/0250679 A1* | 8/2020 | Arora | G06Q 20/04 |

\* cited by examiner

SECURED ANALYTICS USING ENCRYPTED DATA

CROSS-REFERENCE TO RELATED APPLICATIONS

This application claims the benefit of U.S. Provisional Application No. 62/817,444, filed Mar. 12, 2019, the disclosure of which is incorporated by reference as if set forth in full.

TECHNICAL FIELD

This disclosure generally relates to systems and methods for analyzing encrypted data, and more particularly to analyzing encrypted data using secured computation.

BACKGROUND

Organizations may transmit and receive sensitive data such as personal information of customers. Even using encryption to protect personal data may result in security exposures which may compromise the protection of the data.

Figure 1:
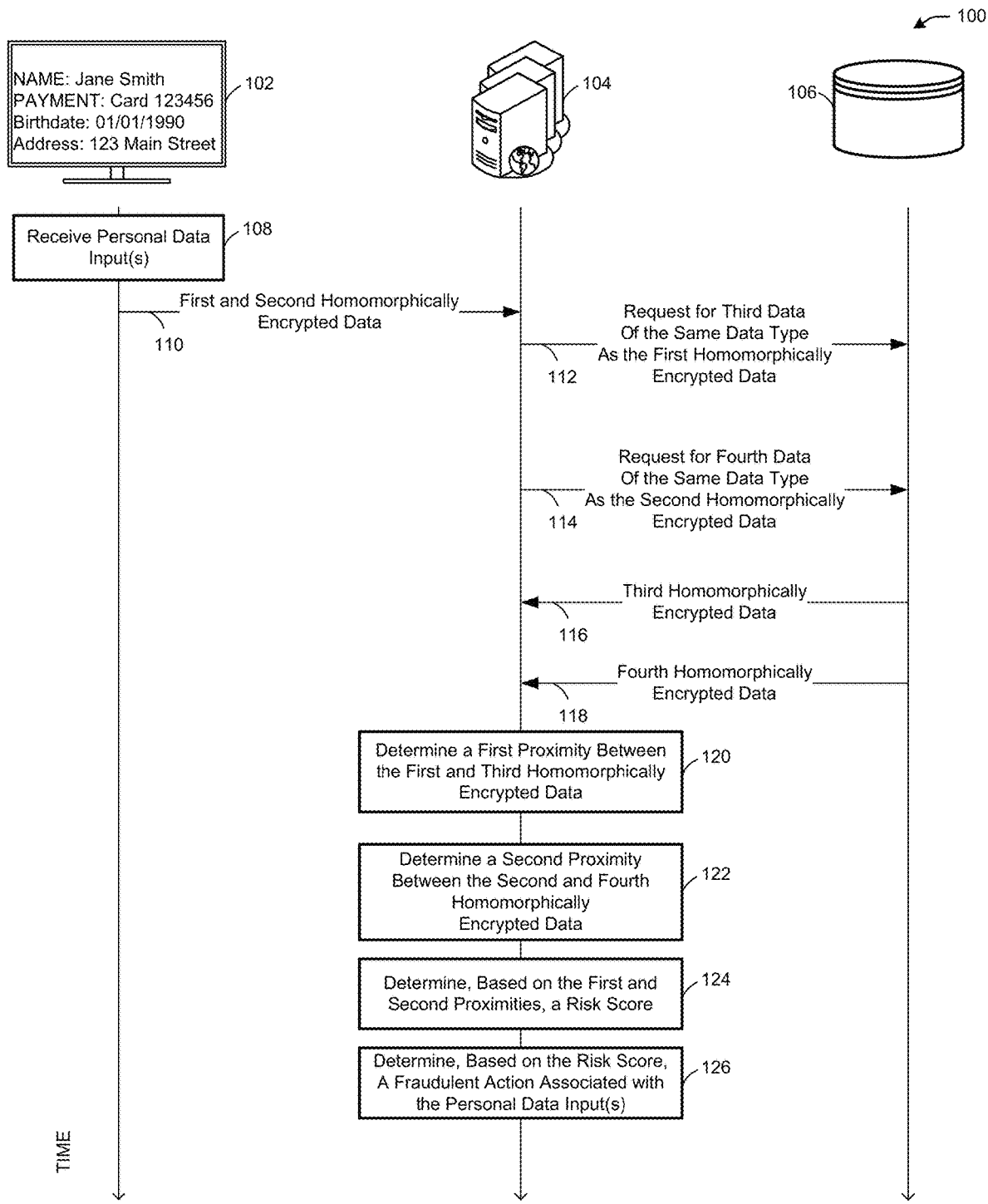
FIG. 1 illustrates an example process for applying analytics to encrypted data, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Organizations often work with sensitive personal information such as social security number (SSN) or credit card numbers. Although this data may be stored and transmitted in encrypted form, some analytical operations, including data analysis and advanced machine learning algorithms, may require data decryption to allow for computation (e.g., to determine whether secured personal information is being used properly or is subject to a fraudulent attack). Decryption may result in unwanted exposures to theft or unauthorized access.

Fraud victimization is one form of economic crime largely executed by deception. A common fraud may include SSN impersonation and/or using unauthorized credit card numbers (e.g., in a card not presented transaction). Homomorphic encryption is one technology which may allow for secure analysis to detect SSN impersonation while avoiding decryption of SSN data and while minimizing the risk of exposing secured information.

Homomorphic encryption provides organizations a secure and easy way to run analytics on data without having to first decrypt it. For example, homomorphic encryption may provide computation capability on encrypted ciphertext, generating an encrypted result which, when decrypted, matches the result of the operations as if they had been performed on the plaintext. For example, if the numbers 100 and 5 were each encrypted as "ABC" and "XYZ," respectively, and the combination of 100 and 5 resulted in an encrypted value of "LMNO," then the decryption of LMNO should result in the number 105 (e.g., the combination of 100+5). Thus, the encrypted result of encrypted 100 and encrypted 5 may be encrypted LMNO, which may be 105 when decrypted.

The security of computation using encrypted results may be improved by avoiding decryption, and instead performing analysis and computation on encrypted data, thereby maintaining encryption. The security of such computation also may be improved by requiring multiple encrypted data attributes to match expected decrypted values and by identifying when encrypted data satisfies a distance or proximity from expected decrypted values.

In one or more embodiments, analyzing encrypted data using secured computation may include identifying an exact SSN match with an encrypted SSN value and generating alerts if there is a mismatch based on pre-defined attributes, such as account attributes (e.g., even if the encrypted SSN value matches an unencrypted SSN value, a transmission may be fraudulent unless one or more other attributes in the transmission, such as name, address, and telephone number, match attributes associated with an account of a user whose SSN value is in the transmission). The attributes may be associated with a user or user account (e.g., account attributes). Analyzing encrypted data using secured computation may include analyzing typographical inputs or communication misinterpretation cases by identifying proximal SSN matches using a combination of Levenshtein distance and Jaro-Winkler distance, and/or other methods of determining distance between sequences, character strings, and the like. For example, if a distance between an encrypted SSN does not match an expected distance or does not satisfy one or more distance thresholds (e.g., the distance is too close or too far away from an expected value or is not within a distance range), then a device may determine that a transmission or other attempt to access information may be fraudulent.

In one or more embodiments, encrypted information may be evaluated for potential fraud or abuse without having to be decrypted. For example, when a device or system receives information (e.g., account information and/or user information, such as a Social Security Number, payment card information, a person's name, an address, personal health information, or the like), the information may be encrypted homomorphically. The device or system may receive the homomorphically encrypted information from another device (e.g., via one or more forms, documents, or the like, via one or more application programming interfaces or the like). The device or system may compare any homomorphically encrypted information with any like information. For example, when the homomorphically encrypted information includes a Social Security Number, the device or system may look up Social Security Numbers from other customers or accounts (e.g., with user permission and in accordance with relevant laws). When the homomorphically encrypted information includes a credit card number, the device or system may look up credit card data of other users or accounts (e.g., with user permission and in accordance with relevant laws).

In one or more embodiments, the device or system may compare like information (e.g., information of the same type). When the device or system receives a homomorphically encrypted Social Security Number, the device or system may compare the a homomorphically encrypted Social Security Number to known Social Security Numbers (e.g., information of the same type), and may determine a distance (e.g., using a Levenshtein-Damereau or other distance calculation) between the homomorphically encrypted Social Security Number and any known Social Security Number. For example, the distance from the number 1234 to the number 2234 may be 10,000, although the proximity of the two numbers may be 1 (e.g., the change from the first digit from a 2 to a 1 or vice versa). Using the proximities or distances of like information (e.g., Social Security Numbers), the device or system may determine whether the homomorphically encrypted Social Security Number is associated with fraud or abuse. For example, a received homomorphically encrypted Social Security Number that has a proximity of 1 from a known Social Security Number (e.g., a Social Security Number of a user having an existing account) may be indicative of a fraudulent attempt to generate an account by providing a Social Security Number that merely changed a single digit from a known Social Security Number. Likewise, other received homomorphically encrypted information may be so similar (e.g., proximal) to known user information that the received homomorphically encrypted information may be likely to be associated with a fraudulent action, such as the opening of an account, changing of account information, identity theft, or the like.

In one or more embodiments, the device or system may consider multiple pieces of received homomorphically encrypted information to determine if the pieces of received homomorphically encrypted information are associated with fraudulent activity. For example, the device or system may consider the relative proximities of a received homomorphically encrypted Social Security Number and a received homomorphically encrypted payment card number in a reception of information (e.g., related to establishing or modifying an account) with respect to like information and may determine a risk score based on the multiple proximity values. For example, when multiple pieces of received homomorphically encrypted information are proximal to (e.g., within respective proximity thresholds of) like information, such may indicate that the received homomorphically encrypted information is part of a fraudulent action. When one received piece of homomorphically encrypted is proximal to like information, but one or more other pieces of received homomorphically encrypted information are not proximal to (e.g., exceed respective proximity distances from) like information, such may result in a lower risk score (e.g., because the proximity of some received information to known information may be coincidence/random).

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 illustrates an example process 100 for applying analytics to encrypted data, in accordance with one or more example embodiments of the present disclosure.

Referring to FIG. 1, the process 100 may include a device 102, one or more remote servers 104, and one or more remote databases 106. At step 108, the device 102 may receive personal data inputs, such as a person's name, payment information, birthdate, address, Social Security Number, or other personal information. The personal data inputs may be received using one or more forms via a website or other applications. At step 110, the device 102 may send first and second homomorphically encrypted data representing homomorphic encryptions of the personal data inputs received at step 108, to the one or more remote servers 104. The persona data inputs may be received as part of an account signup, account login, account recovery, or other use of personal information, and the first and second homomorphically encrypted data may be sent to the one or more remote servers for verification (e.g., to establish a new account, reset an existing account, log into an existing account, or the like). At step 112, the one or more remote servers 104 may send to the one or more remote databases 106 a request for third data of the same data type as the first homomorphically encrypted data. At step 114, the one or more remote servers 104 may send to the one or more remote databases 106 a request for fourth data of the same data type as the second homomorphically encrypted data. The first and second homomorphically encrypted data may be of different data types, such as a name, address, payment information, Social Security Number, birthdate, or other information. The third and fourth data may be data of the same respective data type (e.g., when the first data is a Social Security Number, the third data may include a Social Security Number, and when the second data is a credit card number, the fourth data may include a credit card number). The requests at step 112 and step 114 may be sent using one or more respective application programming interface (API) calls specifying the data type and the corresponding first and second homomorphically encrypted data.

Still referring to FIG. 1, at step 116, the one or more remote databases 106 may identify and send the third homomorphically encrypted data. The third homomorphically encrypted data may be the same data type as the first homomorphically encrypted data. At step 118, the one or more remote databases 106 may identify and send the fourth homomorphically encrypted data. The fourth homomorphically encrypted data may be the same data type as the second homomorphically encrypted data. The steps 112-118 may be referred to as retrieving the third and fourth data. At step 120, the one or more remote servers 104 may determine a first proximity between the first and third homomorphically encrypted data (e.g., the proximity between a Social Security Number entered as a personal data input at step 108 and one or more Social Security Numbers stored in the one or more remote databases 106, and the like). At step 122, the one or more remote servers 104 may determine a second proximity between the second and fourth homomorphically encrypted data (e.g., the proximity between a credit card number entered as a personal data input at step 108 and one or more credit card numbers stored in the one or more remote databases 106, and the like). The third and fourth data stored in the one or more remote databases may be data that has been entered for previously established users and/or accounts. In this manner, the respective proximity determinations may measure the proximity between the personal data inputs received at step 108 and any known data of the same respective type. When the personal data inputs received at step 108 are within respective proximity thresholds of, but not equal to, existing data of the same type stored in the one or more remote databases 106, such may indicate a fraudulent action associated with the personal data inputs received at step 108 (e.g., that a user is attempting to establish a fraudulent account by changing an existing user's Social Security Number by one digit).

Still referring to FIG. 1, at step 124, the one or more remote servers 104 may determine, based on the first and second proximities, a risk score. It may be possible that a single personal data input from step 108 is very similar (e.g., proximal) to existing data in the one or more remote databases 106. Therefore, to provide a more accurate estimate of risk of fraud associated with the input of the personal data at step 108, the one or more remote servers 104 may assess the risk of fraud by considering multiple personal data inputs for one or more actions, such as the personal data inputs provided in association with the creation of an account or attempt to purchase an item. When multiple of the personal data inputs of step 108 satisfy respective proximity thresholds to existing account data (e.g., the third and fourth data), such may indicate that the first and second data are not legitimate uses of real data, but rather are variations on existing account data used to open fraudulent accounts or make fraudulent transactions. In some cases, one or more remote servers 104 may determine whether a proximity is within a proximity range. At step 126, the one or more remote servers 104 may determine, based on the risk score, a fraudulent action associated with the personal data inputs. The risk score may indicate a higher risk of fraud when more of the personal data inputs of step 108 are within respective proximity thresholds or ranges of proximity thresholds of the like data stored in the one or more databases 106, and may indicate a lower risk of fraud when fewer of the personal data inputs of step 108 are within respective proximity thresholds of the like data stored in the one or more databases 106. When the one or more remote servers 104 determine that the risk score indicates that the risk of fraud is too high (e.g., exceeds a risk threshold), the one or more remote servers 104 may prevent one or more actions, such as the creation or modification of an account, or a transaction using the personal data inputs of step 108. An exact match (e.g., a proximity of zero) may indicate that input data matches stored data, which may indicate that the use of the input data is legitimate when multiple inputs provided (e.g., in association with an account creation) also have zero proximity from the stored data.

In one or more embodiments, the one or more remote servers 104 may determine whether any received encrypted data has a correct distance from a respective string. For example, the device may use a Levenshtein or Jaro-Winkler distance to determine whether a received encrypted string has a particular distance, is within a distance threshold from a string, or is within a distance range from a string. When an encrypted SSN has a distance of two from a string (e.g., an encrypted string ABCDEFGHK is two from ABCDEFGHI), for example, but the expected distance is one, the device may identify a fraudulent attempt. Such a method may be valuable in cases when an attacker uses a brute-force attack with a password or a password key, for example. A brute-force attack with a SSN may be identified by a device when the distance between the SSN value input by an attacker does not meet a distance criteria. Therefore, the device may identify typographical inputs or communication misinterpretation by identifying proximal matches based on distance algorithms. The device may use containers and graphical processing units to provide and present real-time information with regard to the use of secure information, attempted attacks, valid uses, and the like.

The device 102 and/or the one or more remote servers 104 may include any suitable processor-driven device including, but not limited to, a mobile device or a non-mobile, e.g., a static, device. For example, the device 102 and/or the one or more remote servers 104 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Figure 2:
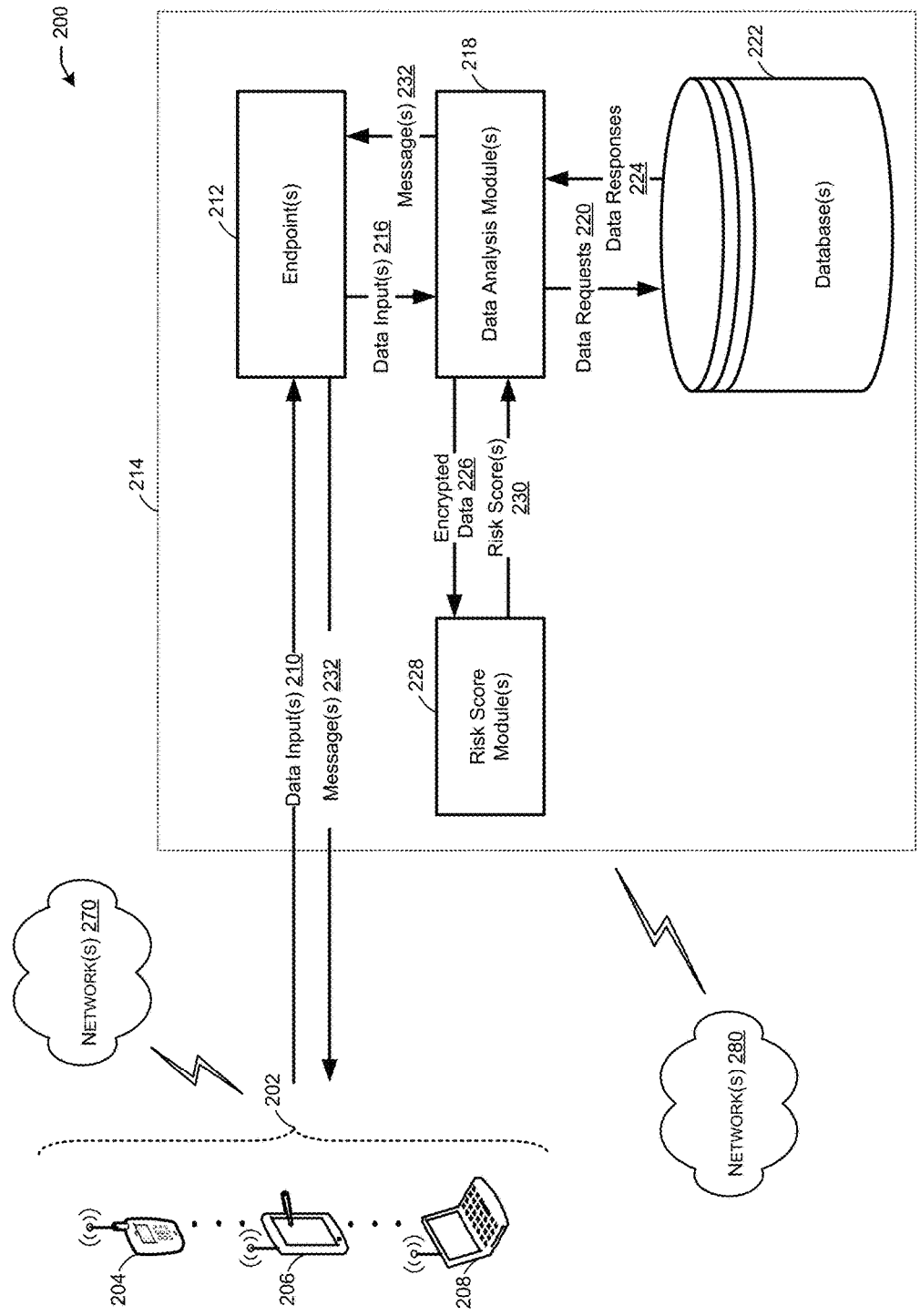
FIG. 2 illustrates a system for applying analytics to encrypted data, in accordance with one or more example embodiments of the present disclosure.

FIG. 2 illustrates a system 200 for applying analytics to encrypted data, in accordance with one or more example embodiments of the present disclosure.

Referring to FIG. 2, the system may include one or more devices 202 (e.g., device 204, device 206, device 208, similar to the device 102 of FIG. 1), which may send one or more data inputs 210 (e.g., similar to the one or more personal data inputs received at step 108 of FIG. 1) to one or more endpoints 212 of a remote computer system 214 (e.g., the one or more remote servers 104 of FIG. 1). The one or more data inputs 210 may be homomorphically encrypted, and the one or more endpoints 212 may send one or more data inputs 216 (e.g., at least a portion of the one or more data inputs 210) to one or more data analysis modules 218 (e.g., a single module or respective modules for a given type of data, such as names, SSNs, payment information, birthdates, and the like). The one or more data analysis modules 218 may send data requests 220 (e.g., similar to the data requests of step 112 and step 114 of FIG. 1) to one or more databases 222 (e.g., similar to the one or more databases 106 of FIG. 1, which may be hosted by the remote computer system 214 as shown, or may be hosted outside of the remote computer system 214). The one or more databases 222 may send data responses 224 (e.g., similar to step 116 and step 118 of FIG. 1) with data of the same type(s) of any of the data inputs 216 indicated in the one or more data requests 220. The data in the one or more data responses 224 may be encrypted (e.g., homomorphically or otherwise) or unencrypted. The data responses 224 may be sent to the respective module of the one or more data analysis modules 218 that sent a respective request of the data requests 220. The data requests 220 and the data responses 224 may refer to retrieving the data responses 224 in a response-request exchange.

Still referring to FIG. 2, the one or more data analysis modules 218 may send encrypted data 226 (e.g., homomorphic encryptions of the data from the data responses 224) to one or more risk score modules 228. In this manner, the or more data analysis modules 218 may determine the types of data received in the one or more data inputs 216 and request like data from the one or more databases 222. The one or more risk score modules 228 may determine the respective proximities of the encrypted data 226 (e.g., respective proximities between any of the one or more data inputs 210 and like data of the one or more data responses 224), or the one or more data analysis modules 218 may make the proximity determinations and include the proximity information in the encrypted data 226. The one or more risk score modules 228 may determine and send risk score 230 (e.g., similar to step 124 of FIG. 1) to the one or more data analysis modules 218. Based on the risk scores 230 (e.g. a respective risk score for the one or more data inputs 210), the one or more data analysis modules 218 may generate one or more messages 232, such as messages indicating the risk scores 230, messages indicating that the one or more data inputs 210 are approved for use, or messages indicating that the one or more data inputs 210 are not approved for use (e.g., an account or transaction associated with the one or more data inputs 210) may be blocked). The one or more endpoints 212 may send the one or more messages 232 to the one or more devices 202 for presentation using the one or more devices 202.

In one or more embodiments, analyzing encrypted data using secured computation may include identifying an exact personal data input match with an encrypted personal data value and generating alerts (e.g., the one or more messages 232) when there is a mismatch based on pre-defined attributes (e.g., even if an encrypted SSN value matches an unencrypted SSN value, a transmission using the one or more data inputs 210 may be fraudulent unless one or more other attributes in the transmission, such as name, address, and telephone number, match attributes associated with an account of a user whose SSN value is in the transmission). Analyzing encrypted data using secured computation may include analyzing typographical inputs or communication misinterpretation cases by identifying proximal SSN matches using a combination of Levenshtein distance and Jaro-Winkler distance, and/or other methods of determining distance between sequences, character strings, and the like. For example, if a proximity between an encrypted SSN does not match an expected distance or does not satisfy one or more proximity thresholds (e.g., the proximity is too close or too far away from an expected value), then a device may determine that a transmission or other attempt to access information may be fraudulent.

In one or more embodiments, encrypted information (e.g., the homomorphically encrypted data of the one or more data inputs 210) may be evaluated by the remote computer system 214 for potential fraud or abuse without having to be decrypted. For example, when the remote computer system 214 receives the one or more data inputs 210 (e.g., account information and/or user information, such as a Social Security Number, payment card information, a person's name, an address, personal health information, or the like), the information may be encrypted homomorphically. The remote computer system 214 may receive the homomorphically encrypted information from the one or more devices 202 (e.g., via one or more forms, documents, or the like, via one or more application programming interfaces or the like). The remote computer system 214 may compare any homomorphically encrypted information with any like information (e.g., information stored in the one or more databases 222). For example, when the homomorphically encrypted information includes a Social Security Number, the remote computer system 214 may look up Social Security Numbers from other customers or accounts (e.g., with user permission and in accordance with relevant laws). When the homomorphically encrypted information includes a credit card number, the remote computer system 214 may look up credit card data of other users or accounts (e.g., with user permission and in accordance with relevant laws).

In one or more embodiments, the remote computer system 214 may compare like information (e.g., information of the same type). When the remote computer system 214 receives a homomorphically encrypted Social Security Number, the remote computer system 214 may compare the a homomorphically encrypted Social Security Number to known Social Security Numbers (e.g., information of the same type), and may determine a proximity (e.g., using a Levenshtein-Damereau or other calculation) between the homomorphically encrypted Social Security Number and any known Social Security Number. For example, the distance from the number 1234 to the number 2234 may be 10,000, although the proximity of the two numbers may be 1 (e.g., the change from the first digit from a 2 to a 1 or vice versa). Using the proximities or distances of like information (e.g., Social Security Numbers), the remote computer system 214 may determine whether the homomorphically encrypted Social Security Number is associated with fraud or abuse. For example, a received homomorphically encrypted Social Security Number that has a proximity of 1 from a known Social Security Number (e.g., a Social Security Number of a user having an existing account) may be indicative of a fraudulent attempt to generate an account by providing a Social Security Number that merely changed a single digit from a known Social Security Number. Likewise, other received homomorphically encrypted information may be so similar (e.g., proximal) to known user information that the received homomorphically encrypted information may be likely to be associated with a fraudulent action, such as the opening of an account, changing of account information, identity theft, or the like.

In one or more embodiments, the remote computer system 214 may consider multiple pieces of received homomorphically encrypted information to determine if the pieces of received homomorphically encrypted information are associated with fraudulent activity. For example, the remote computer system 214 may consider the relative proximities of a received homomorphically encrypted Social Security Number and a received homomorphically encrypted payment card number in a reception of information (e.g., related to establishing or modifying an account) with respect to like information and may determine a risk score based on the multiple proximity values. For example, when multiple pieces of received homomorphically encrypted information are proximal, but not equal to (e.g., within respective proximity thresholds of) like information, such may indicate that the received homomorphically encrypted information is part of a fraudulent action. When one received piece of homomorphically encrypted is proximal, but not equal to like information, but one or more other pieces of received homomorphically encrypted information are not proximal to (e.g., exceed respective proximity distances from) like information, such may result in a lower risk score (e.g., because the proximity of some received information to known information may be coincidence/random).

In one or more embodiments, when the remote computer system 214 analyzes the homomorphically encrypted data of the one or more data inputs 210, the homomorphically encrypted data may remain encrypted (e.g., because the homomorphically encrypted data includes ciphertext, and the homomorphically encrypted data does not need to be decrypted for analysis). When one type of data satisfies a proximity threshold of existing data of the one or more databases 222, then the remote computer system 214 may determine the proximity of one or more other types of data in the one or more data inputs 210 compared to like data in the one or more databases 222. In this manner, the risk scores 230 may be determined when at least one type of data in the one or more data inputs 210 satisfies a proximity threshold of like data in the one or more databases 222. When none of the one or more data inputs 210 satisfies a respective proximity threshold of like data, the remote computer system 214 may not need to determine a risk score, and may allow the transaction using the one or more data inputs 210.

In one or more embodiments, even when one data input of the one or more data inputs 210 has a proximity of 0 (e.g., is an exact match with like data from the one or more databases 222), the one or more data inputs 210 may be used in a fraudulent attempt. In this manner, the remote computer system 214 may consider multiple attributes (e.g., multiple data inputs of the one or more data inputs 210) to determine a risk score. For example, if a credit card number included in the one or more data inputs 210 matches an existing credit card number in the one or more databases 222, such may be an attempt to open an account using someone else's payment information (e.g., the existing credit card number).

In one or more embodiments, while the one or more data analysis modules 218, the one or more risk score modules 228, and the one or more databases 222 are shown as within the remote computer system 214, any of the one or more data analysis modules 218, the one or more risk score modules 228, and the one or more databases 222 may be hosted outside of the remote computer system 214. In this manner, with appropriate permissions and/or compliance, the remote computer system 214 may send the one or more data inputs 216 and/or the encrypted data 226 outside of the remote computer system 214 for analysis, and may receive the data responses 224 and the risk scores 230 from another remote system (not shown).

The one or more devices 202 and/or the remote computer system 214 may include any suitable processor-driven device including, but not limited to, a mobile device or a non-mobile, e.g., a static, device. For example, the one or more devices 202 and/or the remote computer system 214 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

The one or more devices 202 may be configured to communicate via a communications network 270, and the remote computer system 214 may be configured to communicate via the communications network 280, wirelessly or wired (e.g., the same or different wireless communications networks). The communications network 270 and/or the communications network 280 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 270 and/or the communications network 280 may have any suitable communication range associated therewith and may include, for example, global networks (e.g., the Internet), metropolitan area networks (MANs), wide area networks (WANs), local area networks (LANs), or personal area networks (PANs). In addition, communications network 270 and/or the communications network 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3:
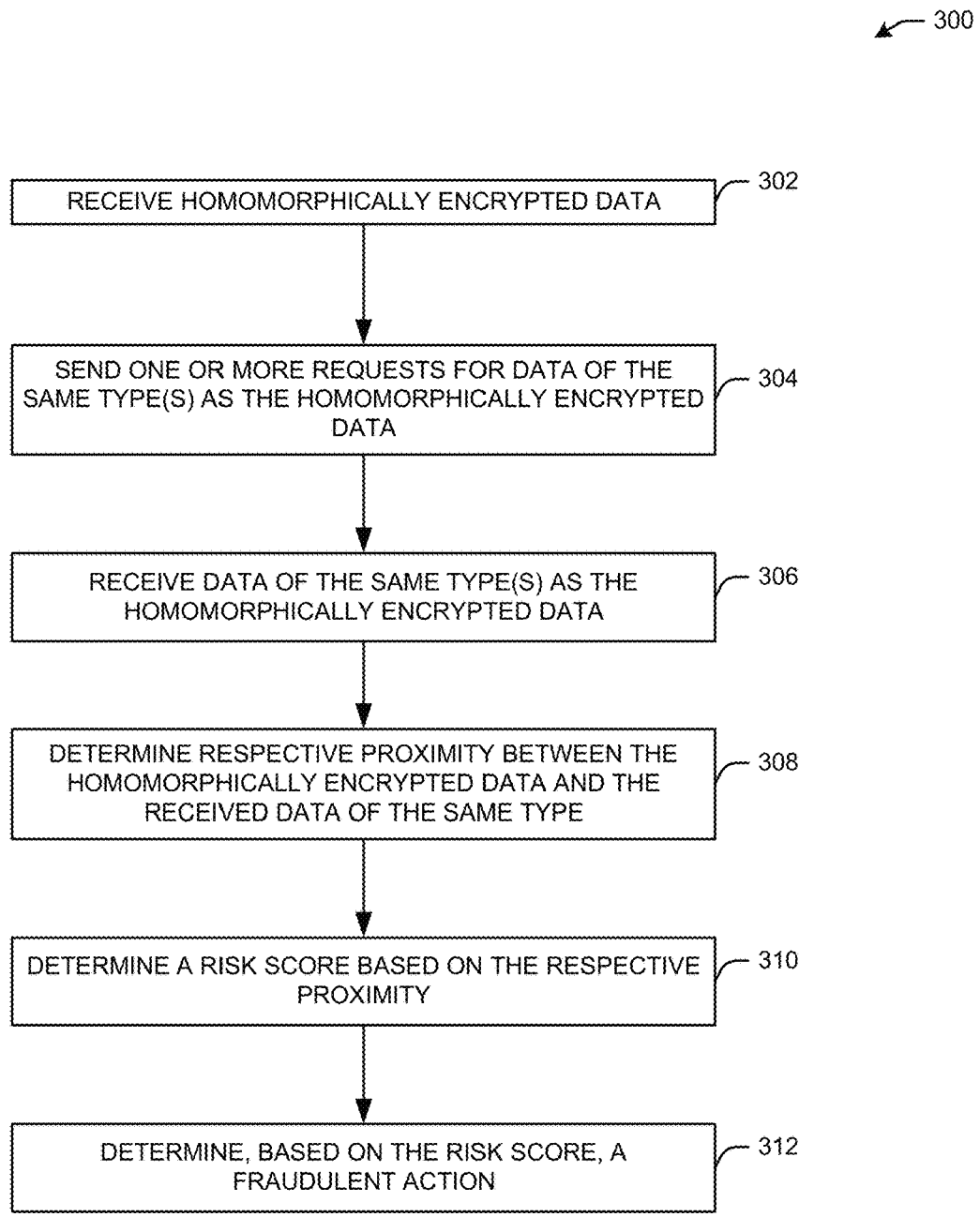
FIG. 3 illustrates an example process for applying analytics to encrypted data, in accordance with one or more example embodiments of the present disclosure.

FIG. 3 illustrates an example process 300 for applying analytics to encrypted data, in accordance with one or more example embodiments of the present disclosure.

At block 302, a system (e.g., the remote computer system 214 of FIG. 2) may receive homomorphically encrypted data (e.g., the one or more data inputs 210 of FIG. 2). The homomorphically encrypted data may include personal information associated with a user creation or modification of an account. For example, the homomorphically encrypted data may include multiple encrypted data inputs, each with their own cipher, such as a person's name, address, e-mail address, SSN or other personal identifier, payment information, date of birth, and/or other personal information.

At block 304, the system may send one or more requests for data of the same types as the homomorphically encrypted data. The system may identify the data types (e.g., a person's name, address, e-mail address, SSN or other personal identifier, payment information, date of birth, and/or other personal information), and may send one or more requests indicating the data types, or may send the one or more requests with the homomorphically encrypted data to one or more databases for like data. For example, the system may identify a SSN as one of the data types of the homomorphically encrypted data, and may request from one or more databases SSN data in return to consider for proximity to the SSN received in the homomorphically encrypted data. Likewise, the system may request other data types from one or multiple databases. The system may maintain the homomorphic encryption of the data. In this manner, the system may not need to decrypt the homomorphically encrypted data, but instead may rely on the ciphers of the homomorphically encrypted data to identify and request like data from the one or more databases.

At block 306, the system may receive data of the same types as the homomorphically encrypted data. When the system requests SSN data, the one or more databases may return SSN data. When the system requests name data, the one or more databases may return names. When the system requests credit card numbers, the one or more databases may return credit card numbers, and the like. The returned data may be homomorphically encrypted, or the system may encrypt the returned data homomorphically to allow for proximity comparisons with the homomorphically encrypted data received at block 302. The request-response exchange at block 304 and block 306 may refer to retrieving the data of the same types as the homomorphically encrypted data received at block 302.

At block 308, the system may determine respective proximities between the homomorphically encrypted data received at block 302 and the like data received at block 306. For example, when the homomorphically encrypted data received at block 302 includes a SSN and the like data received at block 306 includes SSN data, the system may use one or more methods (e.g., Levenshtein-Damereau, Jaro-Winkler, etc.) to determine the proximity between the SSN received at block 302 and any SSNs received at block 306. The system may determine the proximities of other data inputs of the data received at block 302. For example, a credit card number received at block 302 may match a credit card received at block 306, indicating that the payment information may be valid (e.g., matching an existing user's payment information). However, the system may evaluate other data, such as the name and billing address for the user having that payment information. In this manner, the thresholds for name and billing address may be set to zero (e.g., based on the proximity result of another proximity determination). The proximity determinations may use multiple thresholds, such as in the use of proximity ranges. For example, a proximity of zero may indicate an exact match with existing user data, but a proximity greater than zero and less than another threshold proximity may indicate that data received at block 302 is a slight variation of existing user data. The slight variation may be valid, or may indicate fraudulent activity (e.g., that a user has slightly changed existing user data, such as incrementing a SSN, payment account, birthdate, address, etc. when inputting the data at block 302 in an attempt to create an account for fraudulent activity). In another example, a SSN may match an existing SSN, but when other user information associated with the user having the existing SSN does not match the data received at block 302, such may indicate a mismatch (e.g., potential fraud). The proximity determinations may be performed by the system without decrypting the data received at block 302 because the system may rely on the ciphers of the homomorphically encrypted data. In this manner, the risk of unwanted exposure of personal information may be minimized.

At block 310, the system may determine a risk score based on the respective proximities of the encrypted data received at block 302 and the like data received at block 306. The risk score may indicate the likelihood that the data received at block 302 is being used fraudulently. For example, a higher risk score may indicate a higher risk of fraud. The risk score may be based on the number or percentage of inputs from block 302 satisfying proximity thresholds at block 308. When a threshold number or percentage of data inputs from block 302 have proximities that do not indicate fraud (e.g., satisfy proximity thresholds indicating legitimate use), the system may determine a low risk score than indicates that the data from block 302 is being used in a legitimate request or transaction. The system may determine that some inputs from block 302 may need to be an exact match with like data from block 306, that other inputs from block 302 may need to be close enough to (e.g., within proximity thresholds of) like data from block 306, and/or that other inputs from block 302 may need to be outside of proximity thresholds/ranges from like data from block 306. The risk score on the encrypted data may represent the risk score that would be determined if the proximities had been determined on the decrypted versions of the data from block 302.

At block 312, the system may determine, based on the risk score, a fraudulent action. For example, the system may compare the risk score to a risk threshold. When the risk score exceeds the risk score threshold, the system may determine that the risk score indicates that the data from block 302 is being used fraudulently. When the risk score is below the risk score threshold, the system may determine that the data from block 302 is being used legitimately. When the system determines that the data from block 302 is being used fraudulently, the system may block any request made with the data from block 302, such as a request to open a new account or to conduct an transaction using the data from block 302, and the system may send one or more messages indicating the detected fraudulent activity.

Figure 4:
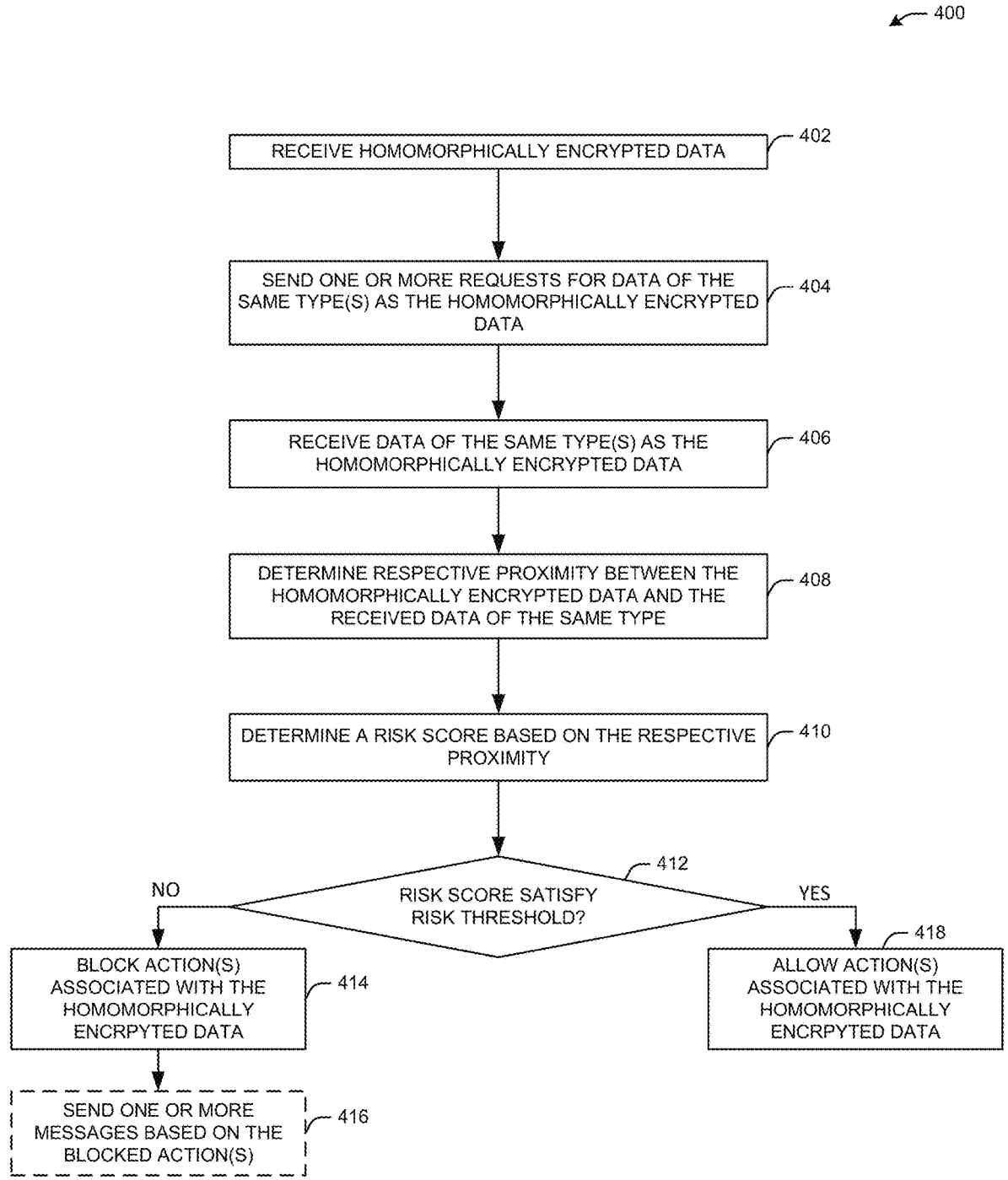
FIG. 4 illustrates an example process for applying analytics to encrypted data, in accordance with one or more example embodiments of the present disclosure.

FIG. 4 illustrates an example process 400 for applying analytics to encrypted data, in accordance with one or more example embodiments of the present disclosure.

At block 402, a system (e.g., the remote computer system 214 of FIG. 2) may receive homomorphically encrypted data (e.g., the one or more data inputs 210 of FIG. 2). The homomorphically encrypted data may include personal information associated with a user creation or modification of an account. For example, the homomorphically encrypted data may include multiple encrypted data inputs, each with their own cipher, such as a person's name, address, e-mail address, SSN or other personal identifier, payment information, date of birth, and/or other personal information. The homomorphically encrypted data may be received in one or more API calls (e.g., together or separately).

At block 404, the system may send one or more requests for data of the same types as the homomorphically encrypted data. The system may identify the data types (e.g., a person's name, address, e-mail address, SSN or other personal identifier, payment information, date of birth, and/or other personal information), and may send one or more requests indicating the data types, or may send the one or more requests with the homomorphically encrypted data to one or more databases for like data. For example, the system may identify a person's name as one of the data types of the homomorphically encrypted data, and may request from one or more databases name data in return to consider for proximity to the name received in the homomorphically encrypted data. Likewise, the system may request other data types from one or multiple databases. The system may maintain the homomorphic encryption of the data. In this manner, the system may not need to decrypt the homomorphically encrypted data, but instead may rely on the ciphers of the homomorphically encrypted data to identify and request like data from the one or more databases.

At block 406, the system may receive data of the same types as the homomorphically encrypted data. When the system requests SSN data, the one or more databases may return SSN data. When the system requests name data, the one or more databases may return names. When the system requests credit card numbers, the one or more databases may return credit card numbers, and the like. The returned data may be homomorphically encrypted, or the system may encrypt the returned data homomorphically to allow for proximity comparisons with the homomorphically encrypted data received at block 402.

At block 408, the system may determine respective proximities between the homomorphically encrypted data received at block 402 and the like data received at block 406. For example, when the homomorphically encrypted data received at block 402 includes a SSN and the like data received at block 406 includes SSN data, the system may use one or more methods (e.g., Levenshtein-Damereau, Jaro-Winkler, etc.) to determine the proximity between the SSN received at block 402 and any SSNs received at block 406. The system may determine the proximities of other data inputs of the data received at block 402. For example, a credit card number received at block 402 may match a credit card received at block 406, indicating that the payment information may be valid (e.g., matching an existing user's payment information). However, the system may evaluate other data, such as the name and billing address for the user having that payment information. In this manner, the thresholds for name and billing address may be set to zero (e.g., based on the proximity result of another proximity determination). The proximity determinations may use multiple thresholds, such as in the use of proximity ranges. For example, a proximity of zero may indicate an exact match with existing user data, but a proximity greater than zero and less than another threshold proximity may indicate that data received at block 402 is a slight variation of existing user data. The slight variation may be valid, or may indicate fraudulent activity (e.g., that a user has slightly changed existing user data, such as incrementing a SSN, payment account, birthdate, address, etc. when inputting the data at block 402 in an attempt to create an account for fraudulent activity). In another example, a SSN may match an existing SSN, but when other user information associated with the user having the existing SSN does not match the data received at block 402, such may indicate a mismatch (e.g., potential fraud). The proximity determinations may be performed by the system without decrypting the data received at block 402 because the system may rely on the ciphers of the homomorphically encrypted data. In this manner, the risk of unwanted exposure of personal information may be minimized.

At block 410, the system may determine a risk score based on the respective proximities of the encrypted data received at block 402 and the like data received at block 406. The risk score may indicate the likelihood that the data received at block 402 is being used fraudulently. For example, a higher risk score may indicate a higher risk of fraud. The risk score may be based on the number or percentage of inputs from block 402 satisfying proximity thresholds at block 408. When a threshold number or percentage of data inputs from block 402 have proximities that do not indicate fraud (e.g., satisfy proximity thresholds indicating legitimate use), the system may determine a low risk score than indicates that the data from block 402 is being used in a legitimate request or transaction. The system may determine that some inputs from block 402 may need to be an exact match with like data from block 406, that other inputs from block 402 may need to be close enough to (e.g., within proximity thresholds of) like data from block 406, and/or that other inputs from block 402 may need to be outside of proximity thresholds/ranges from like data from block 406. The risk score on the encrypted data may represent the risk score that would be determined if the proximities had been determined on the decrypted versions of the data from block 402.

At block 412, the system may determine whether the risk score satisfies a risk threshold. For example, the system may compare the risk score to a risk threshold. When the risk score exceeds the risk score threshold, the system may determine that the risk score indicates that the data from block 402 is being used fraudulently. When the risk score is below the risk score threshold, the system may determine that the data from block 402 is being used legitimately. When the system determines that the data from block 402 is being used fraudulently, the system may proceed to block 414, where the system may block any action requested with the data from block 402, such as a request to open a new account or to conduct an transaction using the data from block 402, and at block 416, the system may send one or more messages indicating the detected fraudulent activity. When the system determines that the risk score satisfies the risk threshold (e.g., is greater than or less than a risk threshold depending on whether a higher risk score indicates higher risk or lower risk), the system may continue to block 418, and may allow actions using the encrypted data from block 402.

Figure 5:
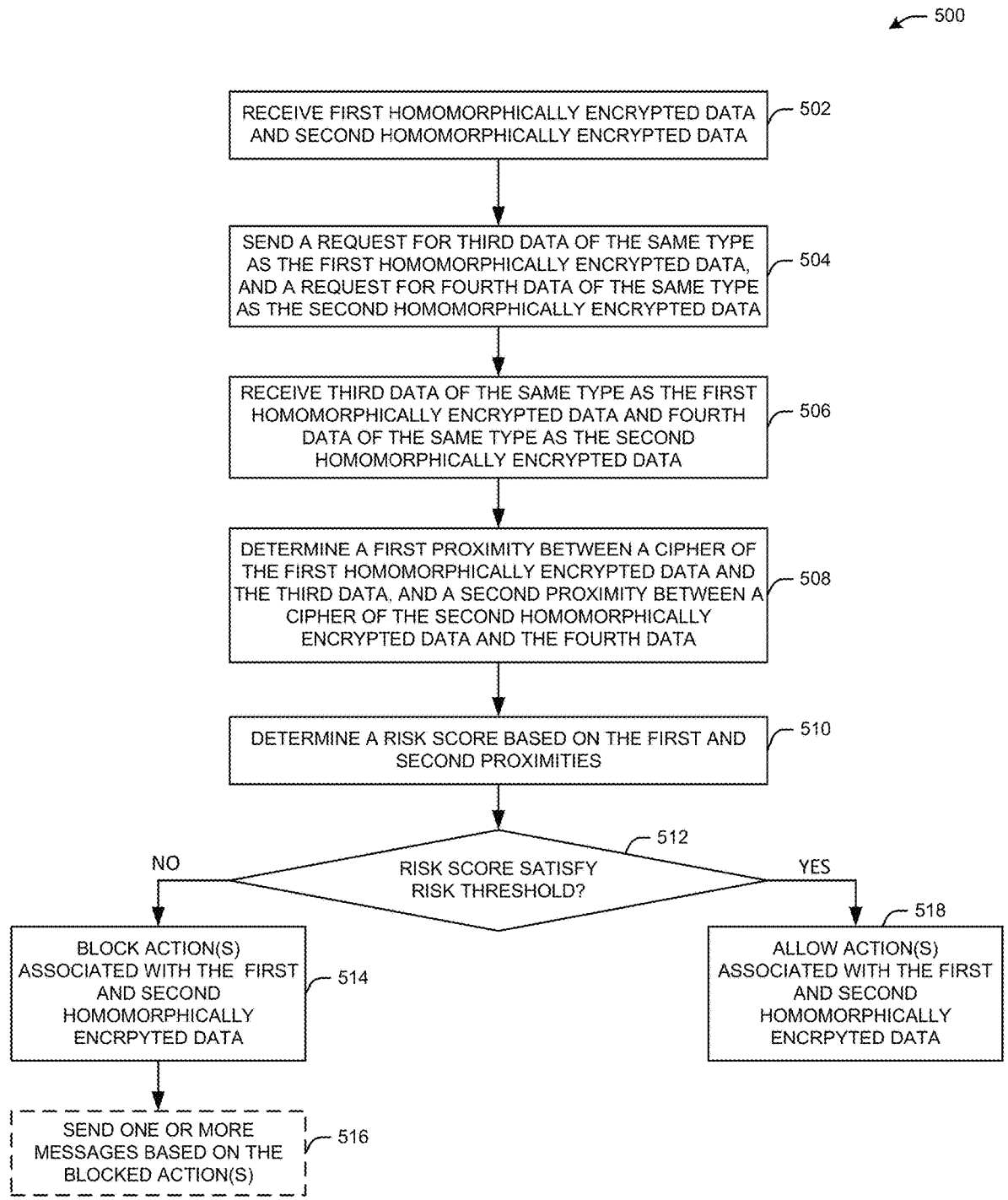
FIG. 5 illustrates an example process for applying analytics to encrypted data, in accordance with one or more example embodiments of the present disclosure.

FIG. 5 illustrates an example process 500 for applying analytics to encrypted data, in accordance with one or more example embodiments of the present disclosure.

At block 502, a system (e.g., the remote computer system 214 of FIG. 2) may receive first and second homomorphically encrypted data (e.g., the one or more data inputs 210 of FIG. 2). The first and second homomorphically encrypted data may include personal information associated with a user creation or modification of an account. For example, the first and second homomorphically encrypted data may be encrypted each with their own cipher, such as a person's name, address, e-mail address, SSN or other personal identifier, payment information, date of birth, and/or other personal information. The first and second homomorphically encrypted data may be received in one or more API calls (e.g., together or separately). The first and second homomorphically encrypted data may be provided using one or more user interfaces, and may be included in one or more submissions with additional data that also may be homomorphically encrypted.

At block 504, the system may send requests for data of the same types as the homomorphically encrypted data. The system may send a request for the first type of homomorphically encrypted data (e.g., a name, SSN, payment information, address, and the like). The system may send another request for the second type of homomorphically encrypted data (e.g., a name, SSN, payment information, address, and the like). The system may identify the data types (e.g., a person's name, address, e-mail address, SSN or other personal identifier, payment information, date of birth, and/or other personal information), and may send the requests indicating the data types, or may send the requests with the homomorphically encrypted data to one or more databases for like data (e.g., a respective database for any data type of the encrypted data received at block 502). For example, the system may identify a person's name as one of the data types of the homomorphically encrypted data, and may request from one or more databases name data in return to consider for proximity to the name received in the homomorphically encrypted data. Likewise, the system may request other data types from one or multiple databases. The system may maintain the homomorphic encryption of the data. In this manner, the system may not need to decrypt the homomorphically encrypted data, but instead may rely on the ciphers of the homomorphically encrypted data to identify and request like data from the one or more databases.

At block 506, the system may receive third data of the same type as the first homomorphically encrypted data and fourth data of the same type as the second homomorphically encrypted data. When the system requests SSN data, the one or more databases may return SSN data. When the system requests name data, the one or more databases may return names. When the system requests credit card numbers, the one or more databases may return credit card numbers, and the like. The returned data may be homomorphically encrypted, or the system may encrypt the returned data homomorphically to allow for proximity comparisons with the homomorphically encrypted data received at block 502.

At block 508, the system may determine a first proximity between the first homomorphically encrypted data received at block 502 and the third data received at block 506. For example, when the first homomorphically encrypted data received at block 502 includes a SSN and the like data received at block 506 includes SSN data, the system may use one or more methods (e.g., Levenshtein-Damereau, Jaro-Winkler, etc.) to determine the proximity between the SSN received at block 502 and any SSNs received at block 506. The system may determine a second proximity between the second homomorphically encrypted data received at block 502 and the fourth data received at block 506. For example, a credit card number received at block 502 may match a credit card received at block 506, indicating that the payment information may be valid (e.g., matching an existing user's payment information). However, the system may evaluate other data, such as the name and billing address for the user having that payment information. In this manner, the thresholds for name and billing address may be set to zero (e.g., based on the proximity result of another proximity determination). The proximity determinations may use multiple thresholds, such as in the use of proximity ranges. For example, a proximity of zero may indicate an exact match with existing user data, but a proximity greater than zero and less than another threshold proximity may indicate that data received at block 502 is a slight variation of existing user data. The slight variation may be valid, or may indicate fraudulent activity (e.g., that a user has slightly changed existing user data, such as incrementing a SSN, payment account, birthdate, address, etc. when inputting the data at block 502 in an attempt to create an account for fraudulent activity). In another example, a SSN may match an existing SSN, but when other user information associated with the user having the existing SSN does not match the data received at block 502, such may indicate a mismatch (e.g., potential fraud). The proximity determinations may be performed by the system without decrypting the data received at block 502 because the system may rely on the ciphers of the homomorphically encrypted data. In this manner, the risk of unwanted exposure of personal information may be minimized.

At block 510, the system may determine a risk score based on the first and second proximities of the encrypted data received at block 502 and the third and fourth data received at block 506. The risk score may indicate the likelihood that the data received at block 502 is being used fraudulently. For example, a higher risk score may indicate a higher risk of fraud. The risk score may be based on the number or percentage of inputs from block 502 satisfying proximity thresholds at block 508. When a threshold number or percentage of data inputs from block 502 have proximities that do not indicate fraud (e.g., satisfy proximity thresholds indicating legitimate use), the system may determine a low risk score than indicates that the data from block 502 is being used in a legitimate request or transaction. The system may determine that some inputs from block 502 may need to be an exact match with like data from block 506, that other inputs from block 502 may need to be close enough to (e.g., within proximity thresholds of) like data from block 506, and/or that other inputs from block 502 may need to be outside of proximity thresholds/ranges from like data from block 506. The risk score on the encrypted data may represent the risk score that would be determined if the proximities had been determined on the decrypted versions of the data from block 502.

At block 512, the system may determine whether the risk score satisfies a risk threshold. For example, the system may compare the risk score to a risk threshold. When the risk score exceeds the risk score threshold, the system may determine that the risk score indicates that the data from block 502 is being used fraudulently. When the risk score is below the risk score threshold, the system may determine that the data from block 502 is being used legitimately. When the system determines that the data from block 502 is being used fraudulently, the system may proceed to block 514, where the system may block any action requested with the data from block 502, such as a request to open a new account or to conduct an transaction using the data from block 502, and at block 516, the system may send one or more messages indicating the detected fraudulent activity. When the system determines that the risk score satisfies the risk threshold (e.g., is greater than or less than a risk threshold depending on whether a higher risk score indicates higher risk or lower risk), the system may continue to block 518, and may allow actions using the encrypted data from block 502.

Figure 6:
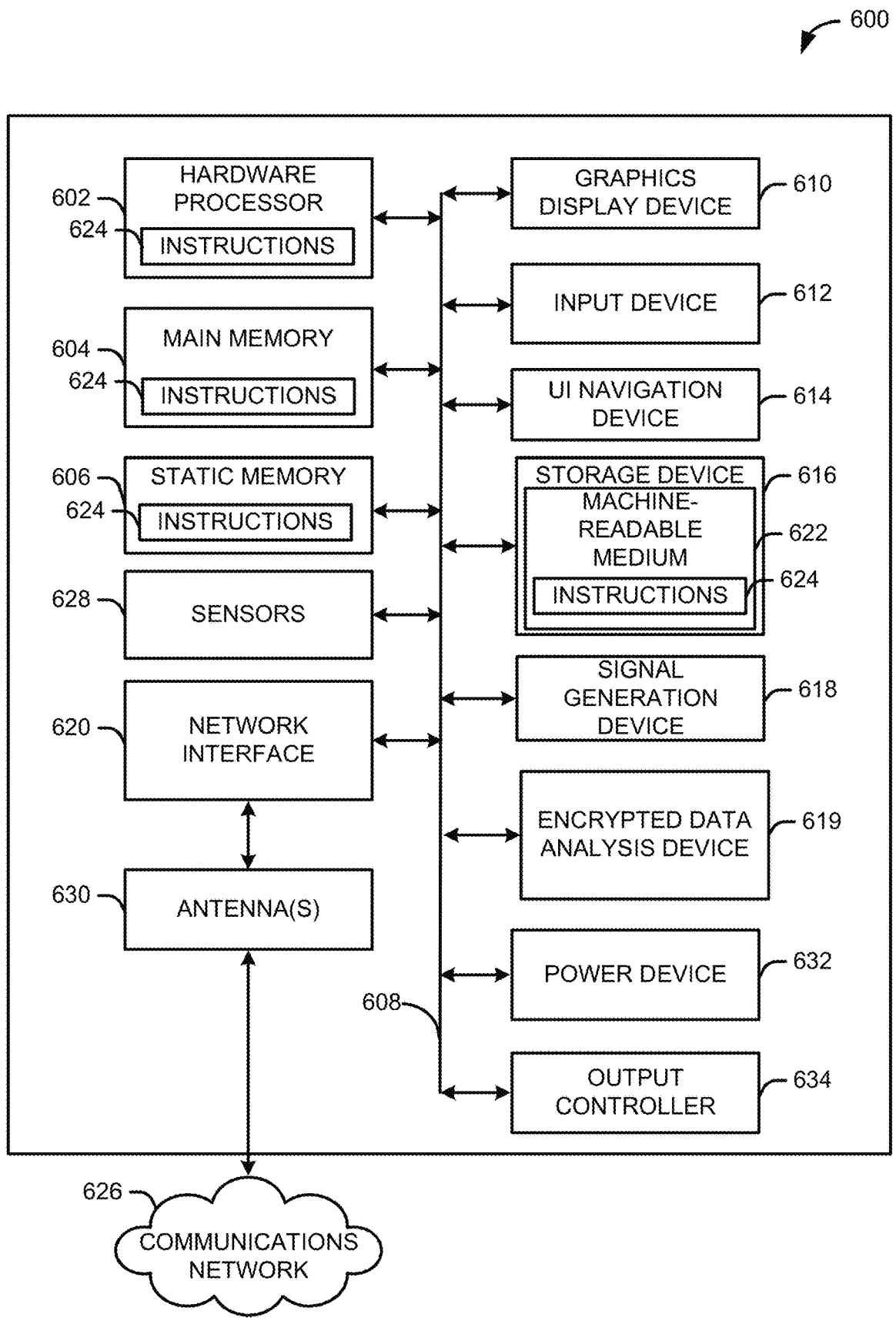
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the device 102 of FIG. 1, the one or more servers 104 of FIG. 1, the one or more devices 202 of FIG. 2, the remote computer system 214 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, an encrypted data analysis device 619 (e.g., that can perform the functions as described in FIG. 1 and FIG. 2, the process 300 in FIG. 3, the process 400 of FIG. 4, and the process 500 of FIG. 5), a network interface device/transceiver 620 coupled to antenna(s) 630, and one or more sensors 628, such as a global positioning system (GPS) sensor, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A method, comprising:
   receiving, by at least one processor of a device, first data and second data, the first data and the second data being homomorphically encrypted, the first data comprising a name of a user, and the second data comprising at least one of a social security number or a payment account of the user;

retrieving, by the at least one processor, third data comprising name data, the third data being homomorphically encrypted;

retrieving, by the at least one processor, fourth data comprising at least one of social security number data or payment account data, the fourth data being homomorphically encrypted;

determining, by the at least one processor, a first proximity between the first data and the third data;

determining, by the at least one processor, a second proximity between the second data and the fourth data, wherein the first proximity and the second proximity are unassociated with an authentication using biometric data;

determining, by the at least one processor, based on a comparison of the first proximity to a first proximity threshold and based on a comparison of the second proximity to a second proximity threshold different than the first proximity threshold; a risk score associated with opening a user account based on the first data and the second data; and identifying, by the at least one processor and based on the risk score, a fraudulent action associated with opening the user account based on the first data and the second data.

2. The method of claim 1, wherein the first data and the third data remain homomorphically encrypted while determining the first proximity, and wherein the second data and the fourth data remain homomorphically encrypted while determining the second proximity.

3. The method of claim 2, wherein the first data comprises first ciphertext, and wherein the second data comprises second ciphertext.

4. The method of claim 1, further comprising:
determining that the first proximity is less than the first proximity threshold; and
determining, based on the first proximity being less than the first proximity threshold, fifth data and sixth data, the fifth data and the sixth data associated with an account attribute,
wherein determining the risk score is further based on a comparison of the fifth data to the sixth data.

5. The method of claim 4, wherein the first data, the second data, and the fifth data are associated with a request to open the user account.

6. The method of claim 5, wherein the fraudulent action indicates that the user account is fraudulent.

7. The method of claim 4, wherein the account attribute is an address associated with the user account.

8. The method of claim 1, wherein the first data comprises first ciphertext, wherein the third data comprises second ciphertext, and wherein the first proximity is a Levenshtein-Damereau distance between the first ciphertext and the second ciphertext.

9. The method of claim 8, further comprising determining that the Levenshtein-Damereau distance is less than the first proximity threshold.

10. A system comprising memory coupled to at least one processor, the at least one processor configured to:
receive first data and second data, the first data and the second data being homomorphically encrypted, the first data comprising a name of a user, and the second data comprising at least one of a social security number or a payment account of the user;
retrieve third data comprising name data, the third data being homomorphically encrypted;

retrieve fourth data comprising at least one of social security number data or payment account data, the fourth data being homomorphically encrypted;

determine a first proximity between the first data and the third data;

determine a second proximity between the second data and the fourth data, wherein the first proximity and the second proximity are unassociated with an authentication using biometric data;

determine based on a comparison of the first proximity to a first proximity threshold and based on a comparison of the second proximity to a second proximity threshold different than the first proximity threshold a risk score associated with opening a user account based on the first data and the second data; and identify, based on the risk score, a fraudulent action associated with opening the user account based on the first data and the second data.

11. The system of claim 10, wherein the first data and the third data remain homomorphically encrypted while determining the first proximity, and wherein the second data and the fourth data remain homomorphically encrypted while determining the second proximity.

12. The system of claim 11, wherein the first data comprises first ciphertext, and wherein the second data comprises second ciphertext.

13. The system of claim 10, wherein the at least one processor is further configured to:
determine that the first proximity is less than the first proximity threshold; and
determine, based on the first proximity being less than the first proximity threshold, fifth data and sixth data, the fifth data and the sixth data associated with an account attribute,
wherein to determine the risk score is further based on a comparison of the fifth data to the sixth data.

14. The system of claim 13, wherein the first data, the second data, and the fifth data are associated with a request to open the user account.

15. The system of claim 14, wherein the fraudulent action indicates that the user account is fraudulent.

16. The system of claim 13, wherein the account attribute is an address associated with the user account.

17. The system of claim 10, wherein the first data is an address associated with the user account.

18. A non-transitory computer-readable medium storing computer-executable instructions which, when executed by a processor, cause the processor to perform operations comprising:
receiving first data and second data, the first data and the second data being homomorphically encrypted, the first data comprising a name of a user, and the second data comprising at least one of a social security number or payment account of the user;
retrieving third data comprising name data, the third data being homomorphic ally encrypted;
retrieving fourth data comprising at least one of social security number data or payment account data, the fourth data being homomorphically encrypted;
determining a first proximity between the first data and the third data, the first proximity greater than zero;
determining a second proximity between the second data and the fourth data, wherein the first proximity and the second proximity are unassociated with an authentication using biometric data;
determining based on a comparison of the first proximity to a first proximity threshold and based on a comparison of the second proximity to a second proximity threshold different than the first proximity threshold, a risk score associated with opening a user account based on the first data and the second data; and identifying, based on the risk score, a fraudulent action associated with opening the user account based on the first data and the second data.

19. The non-transitory computer-readable medium of claim 18, wherein the first data and the third data remain homomorphically encrypted while determining the first proximity, and wherein the second data and the fourth data remain homomorphically encrypted while determining the second proximity.

20. The non-transitory computer-readable medium of claim 18, wherein the first data and the third data remain homomorphically encrypted while determining the first proximity, and wherein the second data and the fourth data remain homomorphically encrypted while determining the second proximity.

* * * * *